United States Patent
Feldman et al.

(10) Patent No.: US 7,246,080 B2
(45) Date of Patent: Jul. 17, 2007

(54) APPARATUS, SYSTEM AND METHOD FOR MEASURING AND MONITORING SUPPLY CHAIN RISK

(75) Inventors: Stuart Irwin Feldman, Stamfield, CT (US); William Grey, Millwood, NY (US); Alan Jonathan King, South Salem, NY (US); Richard Perret, Fairfield, CT (US); Dailun H. Shi, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 09/877,292

(22) Filed: Jun. 8, 2001

(65) Prior Publication Data

US 2002/0188496 A1    Dec. 12, 2002

(51) Int. Cl.
*G06Q 90/00*    (2006.01)
(52) U.S. Cl. ............................................ 705/10; 705/7
(58) Field of Classification Search ............... 705/10
See application file for complete search history.

(56) References Cited

U.S. PATENT DOCUMENTS

| | | | | |
|---|---|---|---|---|
| 5,930,762 | A * | 7/1999 | Masch | 705/7 |
| 5,963,919 | A * | 10/1999 | Brinkley et al. | 705/28 |
| 6,611,727 | B2 * | 8/2003 | Bickley et al. | 700/99 |
| 6,671,673 | B1 * | 12/2003 | Baseman et al. | 705/7 |
| 6,826,518 | B1 * | 11/2004 | Ivezic et al. | 703/6 |
| 6,970,841 | B1 * | 11/2005 | Cheng et al. | 705/28 |
| 2002/0133456 | A1 * | 9/2002 | Lancaster et al. | 705/37 |
| 2002/0156663 | A1 * | 10/2002 | Weber et al. | 705/7 |
| 2002/0161674 | A1 * | 10/2002 | Scheer | 705/28 |
| 2002/0169882 | A1 * | 11/2002 | Fayemi | 709/229 |
| 2004/0199445 | A1 * | 10/2004 | Eder | 705/35 |
| 2005/0197875 | A1 * | 9/2005 | Kauffman | 705/7 |

FOREIGN PATENT DOCUMENTS

GB    2293902 A  *  4/1996

OTHER PUBLICATIONS

Simon Benninga and Zvi Wiener, "Value-at-Risk (VaR)", Mathematica in Education and Research, vol. 7, No. 4, 1998, pp. 1-7.

* cited by examiner

*Primary Examiner*—Andre Boyce
(74) *Attorney, Agent, or Firm*—Duke W. Yee; Stephen C. Kaufman; Gerald H. Glanzmar

(57) ABSTRACT

An apparatus, system and method for managing supply chain risk are provided. The apparatus, system and method identify which components are most critical to the assembly of the final product, in terms of placing the largest amount of revenue or profit at risk. The impact on profit and revenue of the failure to effectively deliver one or more of these critical products along one or more of the dimensions of quantity, time, space, or quality, is then quantified. The revenue and profit distribution from the supply chain is characterized given a projected distribution supply uncertainty, taking into consideration that input products are only useful if all of the BOM components are present. The revenue at risk is then determined. From the set of possible final products that can be produced, the portfolio of final products with the best risk-return characteristics are determined. Efficient hedges may then be developed.

39 Claims, 8 Drawing Sheets

FIG. 5A

REVENUE AT RISK SIMULATION

BILL OF MATERIALS INFORMATION

|  | PRODUCT 1 | PRODUCT 2 |
|---|---|---|
| COMPONENT 1 | 1 | 1 |
| COMPONENT 2 | 2 | 0 |
| COMPONENT 3 | 0 | 2 |
| PRODUCT COST | 201 | 401 |

|  | COMPONENT 1 | COMPONENT 2 | COMPONENT 3 |
|---|---|---|---|
|  | 1 | 2 | 0 |
|  | 1 | 0 | 2 |
|  | UNIT PRICE | | |
|  | $400 | | |
|  | $500 | | |

DEMAND INFORMATION

|  | EXPECTED DEMAND | STD DEV OF DEMAND |
|---|---|---|
| PRODUCT 1 | 100 | 10% |
| PRODUCT 2 | 200 | 20% |

SUPPLY INFORMATION

|  | QUANTITY IN BUILD PLAN | STD DEV OF SUPPLY | UNIT COST |
|---|---|---|---|
| COMPONENT 1 | 300 | 20% | $1 |
| COMPONENT 2 | 200 | 10% | $100 |
| COMPONENT 3 | 400 | 10% | $200 |

REVENUE SIMULATION

SIMULATION ASSUMPTIONS

|  | BASE CASE | COMPONENT 1 | COMPONENT 2 | COMPONENT 3 | COMPONENT | COMPONENT | COMPONENT 3 | | | | |
|---|---|---|---|---|---|---|---|---|---|---|---|
| ORDER PERTURBATION: COMPONENT 1 | 0% | -10% | 0% | 0% | -30% | -20% | -10% | 0% | 10% | 20% |
| ORDER PERTURBATION: COMPONENT 2 | 0% | 0% | -10% | 0% | 0% | 0% | 0% | 0% | 0% | 0% |
| ORDER PERTURBATION: COMPONENT 3 | 0% | 0% | 0% | -10% | 0% | 0% | 0% | 0% | 0% | 0% |

PRODUCTION OUTPUTS

|  | | | | | | | | | | | |
|---|---|---|---|---|---|---|---|---|---|---|---|
| EXPECTED DEMAND FOR PRODUCT 1 | 100 | 100 | 100 | 100 | 100 | 100 | 100 | 100 | 100 | 100 |
| EXPECTED DEMAND FOR PRODUCT 2 | 200 | 200 | 200 | 200 | 200 | 200 | 200 | 200 | 200 | 200 |
| UNIT STD DEV [DEMAND FOR PRODUCT 1] | 10 | 10 | 10 | 10 | 10 | 10 | 10 | 10 | 10 | 10 |
| UNIT STD DEV [DEMAND FOR PRODUCT 2] | 40 | 40 | 40 | 40 | 40 | 40 | 40 | 40 | 40 | 40 |
| REALIZED DEMAND FOR PRODUCT 1 | 100 | 100 | 100 | 100 | 100 | 100 | 100 | 100 | 100 | 100 |
| REALIZED DEMAND FOR PRODUCT 2 | 200 | 200 | 200 | 200 | 200 | 200 | 200 | 200 | 200 | 200 |

TO FIG. 5B

FIG. 5B (FROM FIG. 5A)

| | | | | | | | | | | |
|---|---|---|---|---|---|---|---|---|---|---|
| PRODUCTION INPUTS | | | | | | | | | | |
| ORDER QUANTITY FOR COMPONENT 1 | 300 | 270 | 300 | 300 | 210 | 240 | 270 | 300 | 330 | 360 |
| ORDER QUANTITY FOR COMPONENT 2 | 200 | 200 | 180 | 200 | 200 | 200 | 200 | 200 | 200 | 200 |
| ORDER QUANTITY FOR COMPONENT 3 | 400 | 400 | 400 | 360 | 400 | 400 | 400 | 400 | 400 | 400 |
| UNIT STD DEV [SUPPLY OF COMPONENT 1] | 60 | 54 | 60 | 60 | 42 | 48 | 54 | 60 | 66 | 72 |
| UNIT STD DEV [SUPPLY OF COMPONENT 2] | 20 | 20 | 18 | 20 | 20 | 20 | 20 | 20 | 20 | 20 |
| UNIT STD DEV [SUPPLY OF COMPONENT 3] | 40 | 40 | 40 | 36 | 40 | 40 | 40 | 40 | 40 | 40 |
| QUANTITY RECEIVED: COMPONENT 1 | 300 | 300 | 300 | 300 | 300 | 300 | 300 | 300 | 300 | 300 |
| QUANTITY RECEIVED: COMPONENT 2 | 200 | 200 | 198 | 200 | 200 | 240 | 280 | 320 | 360 | 400 |
| QUANTITY RECEIVED: COMPONENT 3 | 400 | 400 | 400 | 396 | 400 | 400 | 400 | 400 | 400 | 400 |
| INCOME STATEMENT | | | | | | | | | | |
| QUANTITY PRODUCED: PRODUCT 1 | 100 | 100 | 100 | 100 | 100 | 100 | 100 | 100 | 100 | 100 |
| QUANTITY PRODUCED: PRODUCT 2 | 200 | 200 | 200 | 198 | 200 | 200 | 200 | 200 | 200 | 200 |
| REVENUE | | | | | | | | | | |
| PRODUCT 1 | $40,000 | $40,000 | $40,000 | $40,000 | $40,000 | $40,000 | $40,000 | $40,000 | $40,000 | $40,000 |
| PRODUCT 2 | $100,000 | $100,000 | $100,000 | $99,000 | $100,000 | $100,000 | $100,000 | $100,000 | $100,000 | $100,000 |
| REVENUE | $140,000 | $140,000 | $140,000 | $139,000 | $140,000 | $140,000 | $140,000 | $140,000 | $140,000 | $140,000 |
| COGS | | | | | | | | | | |
| SIMULATION RESULTS | | | | | | | | | | |
| REVENUE (MEAN) | 121,793 | 115,427 | 122,104 | 118,288 | 94,095 | 106,765 | 115,777 | 121,579 | 125,889 | 128,021 |
| REVENUE (STD DEV) | 17,453 | 19,379 | 17,505 | 15,737 | 19,684 | 20,230 | 19,077 | 17,857 | 15,907 | 15,431 |
| REVENUE (90th PERCENTILE) | 141,359 | 137,551 | 141,922 | 135,207 | 119,287 | 131,778 | 138,155 | 141,426 | 143,971 | 145,362 |
| REVENUE (10th PERCENTILE) | 98,500 | 88,415 | 98,081 | 97,772 | 68,496 | 79,250 | 90,093 | 97,498 | 104,369 | 107,678 |
| THEORETICAL EXPECTED REVENUE | 140,000 | 140,000 | 140,000 | 140,000 | 140,000 | 140,000 | 140,000 | 140,000 | 140,000 | 140,000 |
| REVENUE SHORTFALL: | | | | | | | | | | |
| MEAN | 18,207 | 24,573 | 17,896 | 21,712 | 45,905 | 33,235 | 24,223 | 18,421 | 14,111 | 11,979 |
| 10th PERCENTILE | 41,500 | 51,585 | 41,919 | 42,228 | 71,504 | 60,750 | 49,907 | 42,502 | 35,631 | 32,322 |
| MEAN (VS. BASE CASE) | | 6,366 | (311) | 3,505 | 27,699 | 15,029 | 6,016 | 215 | (4,096) | (6,288) |
| 10th PERCENTILE (VS. BASE CASE) | | 10,086 | 419 | 729 | 30,005 | 19,250 | 8,408 | 1,002 | (5,868) | (9,177) |
| REVENUE SHORTFALL (PER DOLLAR PERTURBATION IN THEORETICAL COST): | | | | | | | | | | |
| PERTURBATION IN THEORETICAL COST | | 30 | 2,000 | 8,000 | 90 | 60 | 30 | | (30) | (60) |
| MEAN (VS. BASE CASE) | | 212.21 | (0.16) | 0.44 | 307.76 | 250.48 | 200.55 | #DIV/0! | 136.52 | 103.80 |
| 10th PERCENTILE (VS. BASE CASE) | | 336.20 | 0.21 | 0.09 | 333.39 | 320.84 | 280.26 | #DIV/0! | 195.61 | 152.95 |

|  | COMPONENT 1 | COMPONENT 2 | COMPONENT 3 |
|---|---|---|---|
| SERIES 1 | 336.20 | 0.21 | 0.09 |

APPARATUS, SYSTEM AND METHOD FOR MEASURING AND MONITORING SUPPLY CHAIN RISK

BACKGROUND OF THE INVENTION

1. Technical Field

The present invention is directed to an improved data processing system. More specifically, the present invention is directed to an apparatus, system and method for managing supply chain risk.

2. Description of Related Art

Often in the production process, multiple complementary goods must be present simultaneously in order to successfully produce a planned product or service. For example, to build a personal computer, a PC manufacturer needs a disk drive, a processor, memory, a CD-ROM drive, a DVD-drive, a system box, a power supply, etc. This list of items required to assemble a product is called the bill of materials (BOM).

If any single item is missing from the BOM, it is not possible to assemble the final product. Thus, even if all of the components for a PC are available except for the power supply, it is impossible to assemble a working PC.

In a complex supply chain, careful coordination among multiple tiers of suppliers is required to successfully deliver the required quantities of input components to the right place at the right time. Often a single supply chain is composed of multiple final assembly facilities, all with different planned outputs. The risk of failure is present along multiple dimensions. These include quantity, i.e. the number of input units supplied by a particular supplier; time, i.e. the time when the units are delivered; space, i.e. the location to which the units are delivered; and quality of the input units.

A number of factors can contribute to supply chain disruptions. These include normal variability in manufacturing and logistics cycle times, as well as low-frequency events such as earthquakes, fires, wars, political turmoil, and strikes. Supply chain failures or disruptions can seriously damage a firm financially. They can also lead to a loss of competitive advantage, erosion in market share, and damage to brand and reputation.

Although manufacturers are aware of these risks, there are no tools currently available to effectively manage supply chain risk. In an effort to lessen such risks, manufacturers can use multiple suppliers, and maintain an excessive surplus of BOM items as a safeguard in case a problem arises with one or more suppliers. However, unless firms can efficiently manage their inventory levels and coordinate with their supplier, these approaches have only limited effectiveness, and can increase the costs to manufacture the final product.

Therefore, it would be beneficial to have an apparatus, system and method for managing supply chain risk to help protect firms from loss of competitive advantage, erosion in market share, and damage to brand and reputation

SUMMARY OF THE INVENTION

The present invention provides an apparatus, system and method for managing supply chain risk. The present invention identifies which components are most critical to the assembly of the final product, in terms of placing the largest amount of revenue or profit at risk. The impact on profit and revenue of the failure to effectively procure or deliver one or more of these critical components or products may then be quantified.

The revenue and profit distribution from the supply chain is characterized given a projected distribution of supply uncertainty, taking into consideration that input products are only useful if all of the bill of materials (BOM) components are present. Other correlated or uncorrelated risk factors are identified, such as supplier defaults, natural disasters, labor strikes, delivery problems, and the like. The revenue at risk is then determined, e.g., the maximum dollar value of revenue that could be expected to be lost over a specified time period with a specified confidence given the projected distribution of supply uncertainty.

Other "at risk" measures can be used as well, including profit at risk, and value at risk. At risk measures can also be used relative to a benchmark, such as a planned revenue or profit target, or the performance of a competitor.

From the set of possible final products that can be produced, the portfolio of final products with the best risk-return characteristics are determined. Efficient hedges may then be developed. Hedging, in this context, may entail changing contractual terms and conditions to include supplier penalties for failure to deliver, that are commensurate with the risk exposure of the customer. Hedging may also entail maintaining extra inventory of high-risk input products, or establishing redundant sources of supply of high-risk input products.

Moreover, hedging according to the present invention may entail developing sourcing strategies with multiple suppliers. In special cases, hedging may involve using special insurance policies, such as political risk insurance, or business disruption insurance. In the case where there are correlated risk factors, it may be possible to hedge some risk using financial products, such as credit risk products and catastrophe risk products.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5A is a diagram illustrating example inputs to a revenue at risk simulation in accordance with the present invention;

FIG. 5B is a diagram illustrating example results of the revenue at risk simulation according to the present invention;

DETAILED DESCRIPTION OF THE PREFERRED EMBODIMENT

Figure 1:
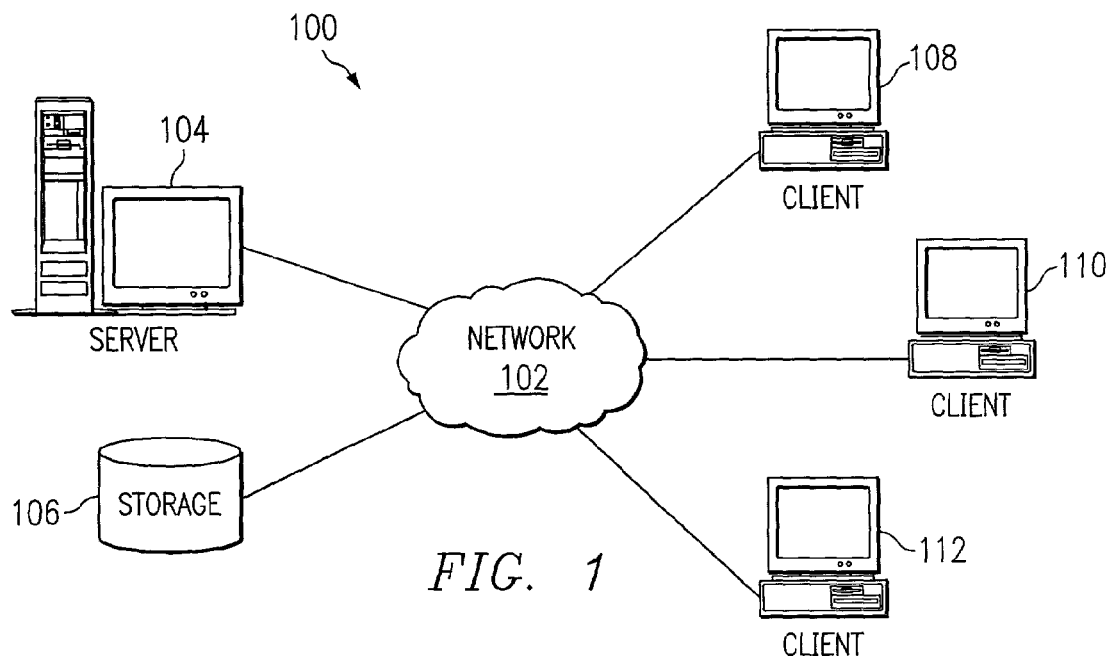
FIG. 1 is an exemplary block diagram of a network data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
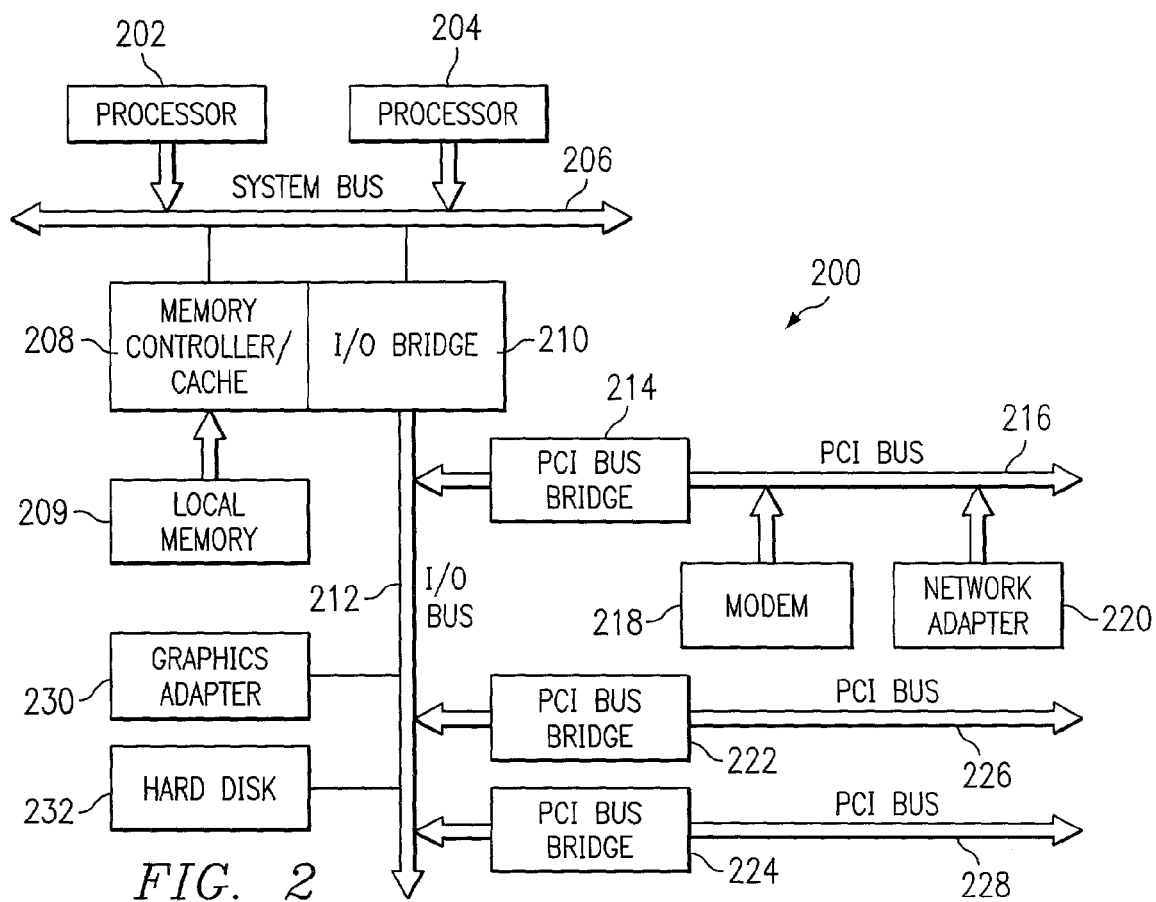
FIG. 2 is an exemplary block diagram of a server in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
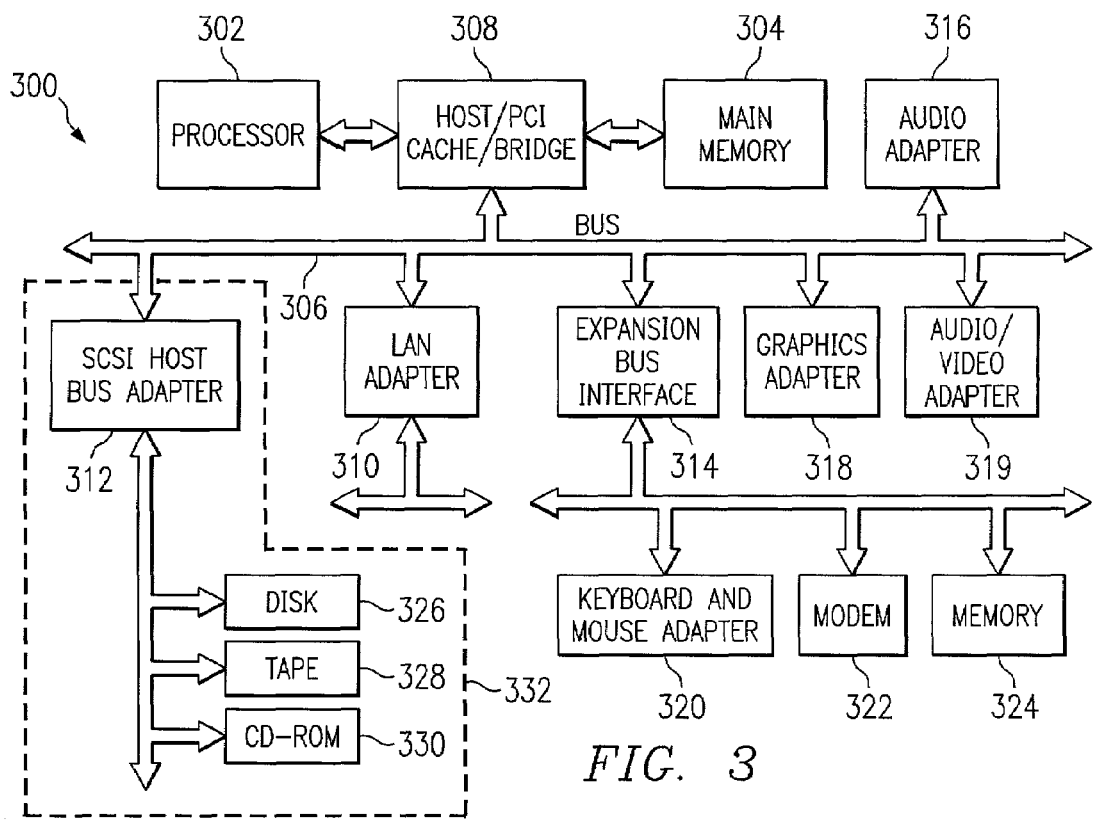
FIG. 3 is an exemplary block diagram of a client device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and the above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a mechanism by which revenue at risk may be determined in order to perform supply chain management. "At risk" calculations are typically done for equity or financial portfolios and, prior to the present invention, have not been used to analyze and manage supply chain risk. For example, in Benninga et al., "Value-at-Risk (VaR)," Mathematcia in Education and Research, volume 7, number 4, 1998, pages 1–7, which is hereby incorporated by reference, the authors describe a mechanism for implementing value-at-risk to perform financial risk management. Value-at-risk measures the worst expected loss under normal financial market conditions, over a specific time interval at a given confidence level. Also, various web site resources are listed at www.gloriamundi.org/var/links.html which provide information regarding the use of value-at-risk to evaluate financial portfolios. In addition, U.S. Pat. Nos. 6,058,175; 6,058,377; and 5,819,237 each teach various methods of determining value-at-risk of a financial portfolio, portfolio structuring, and determining value-at-risk for securities trading. These publications are hereby incorporated by reference herein.

The present invention expands upon the value-at-risk type calculations described above by providing an apparatus, system and method for determining revenue at risk for manufacturing products and using the revenue at risk as a mechanism for managing the supply chain risk for the products. Managing such supply chain risk may include, for example, determining a portfolio of products to be provided by the product manufacturer as well as determining hedging recommendations for the various products.

The present invention may be implemented in a standalone device, such as client device 300 in FIG. 3, or may be distributed across multiple devices, such as client device 300 and server 200 in FIG. 2. In addition, the supply chain management device of the present invention may be implemented in hardware, software, or a combination of hardware and software. In a preferred embodiment, the supply chain management device of the present invention is implemented as software instructions executed by a server device that is accessible by a client device via one or more networks.

Figure 4:
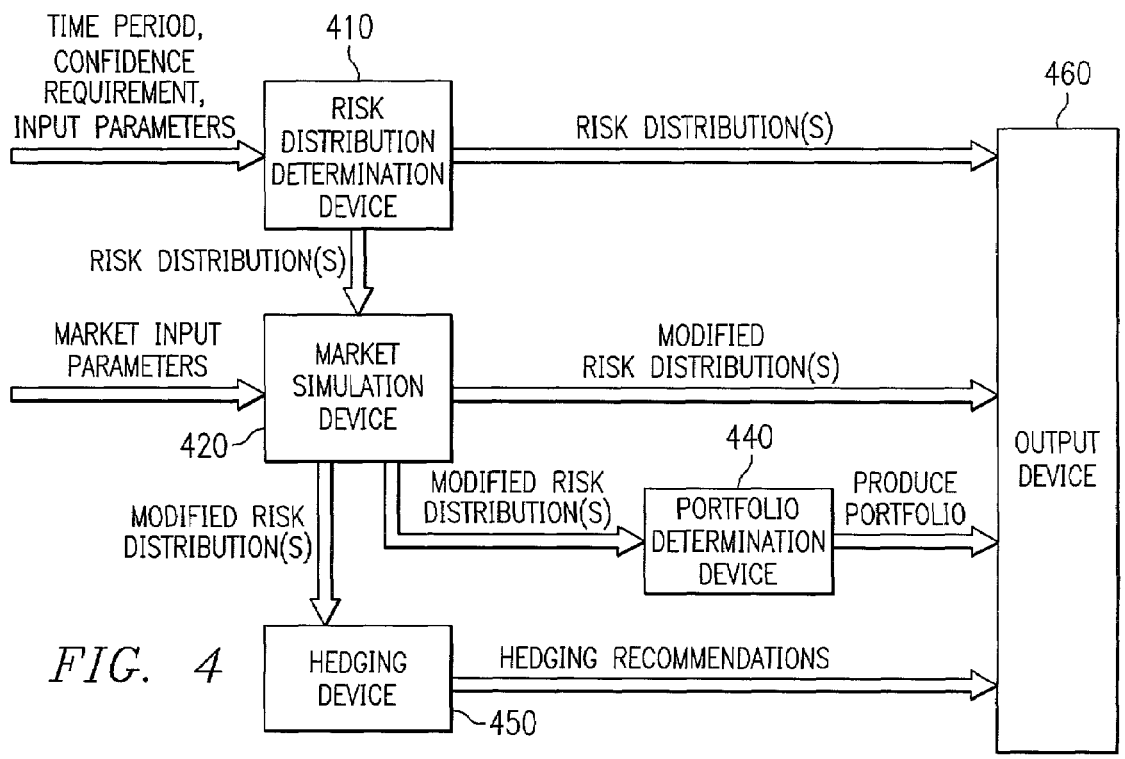
FIG. 4 is an exemplary block diagram illustrating the primary operational components of a supply chain management device in accordance with the present invention.

FIG. 4 is an exemplary block diagram illustrating a data flow among the primary components of a supply chain management device in accordance with a preferred embodiment of the present invention. As mentioned above, the components shown in FIG. 4 may be implemented in hardware, software, or a combination of hardware and software.

As shown in FIG. 4, the supply chain management device 400 includes a risk distribution determination device 410, a market simulation device 420, a portfolio determination device 440, a hedging device 450, and an output device 460. These devices may be coupled together in a single device by way of a bus, serial connection, or the like. Alternatively, these devices may be distributed among a plurality of devices in a distributed data processing system and may be coupled by way of one or more networks and network connections.

The risk distribution determination device 410 accepts as input various parameters directed to the particular product, the supply chain, time period of interest, empirical data, forecasts, assumptions, and heuristics. For example, the input parameters may include a list of components of the product, e.g., a bill of materials, a listing of the suppliers of the various components as well as their geographical location in relation to the manufacturer of the final product, shipping services and routes used to ship the components to the manufacturer, forecasts of material and labor availability, costs of each component, selling price of the final product, maximum amount of inventory of components to be kept on-hand, and the like.

In addition to these parameters, the input parameters include a set of rules that specify the manner by which the components are combined to form the final product. Such rules may include the order in which components are combined, the amount of labor required at each step of the process, the amount of time for each step of the process and between processes, and the like.

The input parameters to the risk distribution determination device 410 may be obtained from a number of different sources. For example, the input parameters may be obtained from a user via an input interface or client device coupled with the supply chain management device 400. In addition, or alternatively, the input data may be obtained from software applications or databases associated with software applications. Such software applications might include an Enterprise Resource Planning system as is available from Oracle Corporation, or a Supply Chain Planning system as is available from I2 Corporation or Manugistics. This data might be obtained by data integration with the present system, or by other means known to those familiar with the art. In addition, or alternatively, the input data may be obtained from databases or data warehouses storing supply chain or other data used to support the operations of the firm, its customers, or its suppliers. This data might be obtained by data integration with the present system, or by other means known to those familiar with the art. In addition, or alternatively, the input data may be obtained from market data suppliers coupled to the at least one network. For example, forecasts of material and labor availability over the selected time period may be obtained from a source on the network that makes and stores data related to such forecasts. In addition, geographical location information for suppliers may be obtained from geographical databases. On-time statistics of shipping companies may be obtained from government or commercial data suppliers, and the like.

The input parameters that are input to the risk distribution determination device 410 are processed based on a model for identifying projected distributions of risk. In a preferred embodiment, the projected distribution of risk is along the dimension of quantity. That is, a projected distribution of risk is generated by the present invention based on variations in the availability of components for the desired product.

In identifying a projected distribution of risk along the dimension of quantity, the input parameters are quantified and input to a model that generates a distribution of the quantity of components on-hand over the time period selected. Based on the distribution, a determination is made as to a probability that the manufacturer will successfully have enough components on-hand over the selected period within a confidence level.

The risk distributions obtained from the risk distribution determination device 410 are output to the market simulation device 420. In addition, the market simulation device 420 may obtain various input parameters related to the particular market of the final product. These include, for example, historical labor turnover rates, probability of labor strikes, market slow downs, environmental effects, demand volatility for the final product, volatility in supplier lead times, variants in component quality, and variants in supplier serviceability. The input parameters and the risk distributions are received by the market simulation device 420 which simulates market influences on the risk distributions for the selected time period. The market influences will cause the risk distributions to be modified from the risk distributions output by the risk distribution determination device 410. The modified risk distributions may then be output to the portfolio determination device 440.

The distribution required to compute revenue at risk may be generated for a number of final products produced by the manufacturer. Based on these distributions, a portfolio of final products whose risk-return characteristics are in line with the manufacturer's business goals may be identified. As shown in FIG. 4, the modified distributions of risk are input to a portfolio determination device 440. The portfolio determination device 440, based on rules describing the business goals of the manufacturer, identifies the products that have a risk-return characteristic that is in line with the business goals of the manufacturer.

In addition to helping to identify the portfolio of the products for the manufacturer, the present invention may develop hedging criteria for hedging contractual terms, extra inventory, and the like, to provide security that the manufacturer will be able to meet his goals over the selected time period. Such hedging may include adding supplier penalties to supply contracts, adjusting inventory levels of components to make sure that a minimum amount of components are on hand at any one time to ensure enough to complete the final products, and the like. These and other hedges may be identified and recommended by the hedging device 450.

Portfolio determination device 440 and hedging device 450 may be implemented using techniques familiar to those skilled in the art, including simulation, optimization, and the use of heuristics. The portfolio determination device 440 may be a stand alone system, a decision support tool that may be used to assist a human being in making a decision, or the like.

The distribution of revenue at risk from risk distribution determination device 410, the market simulation device 420, the product portfolio from the portfolio determination device 440, and hedging recommendations from the hedging device 450, may all be output to the user via the output device 460. The output device 460 may be a display, speakers, or the like. In this way, the present invention provides information to a user that may be used to manage supply chain risk.

Although the preferred embodiment described above generates projected distributions of risk along the quantity dimension, the present invention is not limited to such. Rather, the present invention may be used to generate distributions of risk along any dimension, such as the dimensions of time, space, and quality.

With respect to the projected distribution of risk along the time dimension, the input parameters are quantified and input to a model that generates a distribution of the time required to generate a final product. Based on this distribution, a determination may be made as to the probability that the manufacturer will obtain components in time to complete the final product within a predetermined time limit, within a confidence level.

As to the projected distribution of risk along the spatial dimension, the input parameters are quantified and input to a model that generates a distribution as to whether components are received at the proper location within the selected time period. Based on this distribution, a determination may be made as to the probability that the manufacturer will be able to deliver the final products to the proper location within the selected time period, within a confidence level.

With the projected distribution of risk along the quality dimension, the input parameters are quantified and input to a model that generates a distribution of the quality of the components received and the final product over the selected time period. Based on this distribution, a determination may be made as to the probability that the manufacturer's final product will meet predetermined quality standards over the selected period of time, or that a specified number of products will meet a predetermined quality standard, within a confidence level.

The present invention, as mentioned above, may generate risk distributions along any of these dimensions. Moreover, the present invention may generate risk distributions among two or more of these dimensions at approximately the same time. In one embodiment of the present invention, if multiple risk distributions along different dimensions are generated, the present invention may analyze the interdependency of these distributions. That is, an interdependency simulation, provided by an interdependency simulation device, may be used to take into consideration the interdependency of the various risk distributions along these dimensions. For example, the time that is required to generate a final product is influenced by the likelihood that there is enough of each component available to make the final product, the quality of the components, capacity availability, and the like.

The interdependency simulation may include a model that simulates the interdependency of the various dimensions. The risk distributions along each of the dimensions may be input to the interdependency simulation and combined using the model. The combined distribution represents a distribution of the revenue at risk taking into account the interdependencies of the risk distributions along the various dimensions. In other words, the combined distribution represents the probability that a required number of quality final products will be produced and generate enough revenue on time during the specified time period, within a confidence level. Or, to look at it a different way, the combined distribution indicates the probability of a shortfall of quality final products produced on time during the specified time period, within a confidence level.

FIGS. 5A–5I illustrate an example revenue at risk simulation in accordance with the present invention. The example simulation depicted in FIGS. 5A–5I is along a single dimension, i.e. quantity, for simplicity of the explanation. Because only a single dimension is used, there is no need for the interdependency simulation described above.

FIG. 5A represents the inputs to the revenue at risk simulation. These inputs are provided to the risk distribution determination device 410, for example. As shown in FIG. 5A, the revenue at risk simulation is generated for two products: product 1 and product 2. According to the bill of materials for these products, there are three components that are used in the making of products 1 and 2. Product 1 uses one unit of component 1 and two units of component 2. Product 2 uses one unit of component 1 and two units of component 3.

The production cost for each unit of product 1 is 201 monetary units and the cost for each unit of product 2 is 401 monetary units. The monetary units will be considered to be dollars hereafter for simplicity. The cost for each unit of products 1 and 2 is based on a $1 cost for component 1, a $100 cost for component 2, and a $200 cost for component 3.

The simulation assumes an expected demand for product 1 to be 100 units and 200 units for product 2 with a standard deviation of 10% and 20% respectively. The expected selling price for each unit of product 1 is $400 and $500 for product 2.

Based on the above, it is determined that in order to meet the expected demand for products 1 and 2, 300 units of component 1, 200 units of component 2, and 400 units of component 3 are required. It is assumed that a standard deviation of the supply of components 1, 2 and 3 are 20%, 10% and 10%, respectively. The standard deviations presented here are merely exemplary. In practice, however, standard deviations may be estimated using standard techniques known to those skilled in the art, such as analysis of historical data, forecasts generated using forecasting tools, forecasts generated by domain experts, scenario analysis, etc.

Having made the above inputs to the revenue at risk simulation, various perturbations of the component availability will be simulated in order to determine the sensitivity of the generated revenue to the supply of the various components. As shown in FIG. 5A, a base case assumes that 100% of all needed components are supplied on time for use in producing products 1 and 2. This corresponds to a 0% perturbation. Thereafter, the supply of each of the components are modified by a predetermined percentage. That is, for example, in the second simulation, the supply of component 1 is reduced by 10%. In the third simulation, the supply of component 2 is reduced by 10%, and so on.

The production outputs are set to the expected demand with the realized demand being equal to the expected demand. However, the expected demand and realized demand may be different without departing from the spirit and scope of the present invention. The unit standard deviation of the demand is the product of the standard deviation of demand and the expected demand in terms of units.

Based on the simulation assumptions, i.e. the perturbations in each of the simulations, an order quantity for the various components is determined. The order quantity is the sum of the quantity in the build plan and the product of the perturbation and the quantity in the build plan. That is, for example, the order quantity for component 1 in the second simulation is 300+(−10%)*(300)=270 units.

The unit standard deviation of supply of the various components is equal to the product of the standard deviation of supply and the quantity in the build plan. Thus, for example, the unit standard deviation of supply for component 1 in the base case is 300*0.20=60 units.

While the simulation example shown in FIG. 5A indicates a particular quantity received for components 1, 2 and 3, these quantities are only exemplary default values that are present at the start/end of the simulation. During the simulation, different quantities of the components received would be provided using, for example, a random number generator and assumptions about the distribution, the means and standard deviations.

Based on the above simulation assumptions, production outputs, and production inputs, a quantity of product 1 and product 2 are assumed to be able to be generated.

Based on the inputs shown in FIG. 5A, distributions of component availability may be identified. That is, the columns shown in FIG. 5A designate a distribution of component availability and expected revenue. These distributions may then be input to the market simulation device 420 which simulates market influences on the component availability distributions over a predetermined period of time. The results of the simulation are shown in FIG. 5B.

As shown in FIG. 5B, the mean revenue of the modified revenue distribution is less than the theoretical expected revenue. For example, in the base case, the mean revenue is $18,207 less than the theoretical expected revenue. In addition, at the 10th percentile, the revenue shortfall is expected to be about $41,500. This is the revenue at risk metric. This metric represents that 90% of the time for the time period of the analysis, the firm's revenue shortfall will be at most $41,500. The further simulations identify corresponding means and expected maximum revenue shortfalls for the 10th percentile. In addition, the difference between the means of these various other simulations and the base case are identified along with the difference between the 10th percentile dollar values and the base case.

In addition, the results of the simulation identify the revenue shortfall per dollar perturbation in theoretical cost. For example, the perturbation in theoretical cost for the second simulation is $30, i.e. the product of the perturbation, the component supply from the build plan, and the per component unit cost (0.10*300*$1). The revenue shortfall per dollar perturbation of the change in the mean revenue from the base case is $212.21 for the second simulation. The revenue shortfall per dollar perturbation of the change in the 10th percentile from the base case is $336.20.

Thus, the average change in revenue per dollar not spent on component 1 is expected to be $212.21. In other words, for every dollar saved by not ordering a unit of component 1, an average of $212.21 in revenue is lost. Moreover, within a 90% confidence level, the maximum revenue lost per dollar saved on component 1 is expected to be $336.20. Furthermore, the actual savings from not ordering component 1 is probably less than $1, since even if the firm over ordered component 1, it could either use it in the next time period, or in all likelihood sell it for some non-negative salvage value.

Figure 5C:
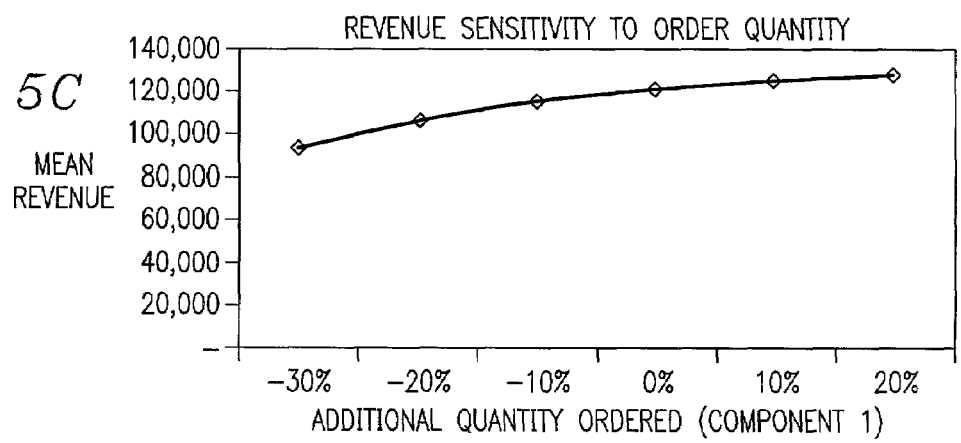
FIGS. 5C–5H are graphs of exemplary results of the revenue at risk simulation according to the present invention.

From these results, various graphs may be generated to identify how the results change based on the change in simulation inputs. Each of these graphs may be output to the output device 460 for use by a human operator in identifying revenue at risk. For example, FIG. 5C shows a graph of the revenue sensitivity to order quantity. As shown in FIG. 5C, the mean revenue decreases by more than $20,000 with a 30% reduction in quantity of component 1 ordered. Likewise, with an increase of 20% in the quantity of component 1 ordered, approximately a $10,000 increase in mean revenue is realized.

Figure 5D:
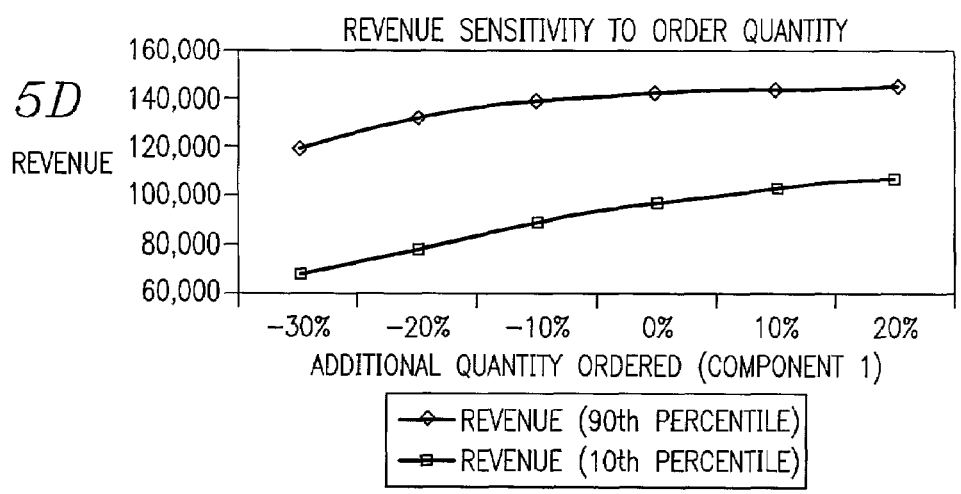

FIG. 5D shows a graph of revenue sensitivity to order quantity for the 90th and 10th percentiles. This graph identifies that within a 80 percent confidence level, the expected revenue generated is between the 10th percentile and the 90th percentile. Thus, for example, with a 30% reduction in the quantity of component 1 ordered, the minimum revenue generated, within a 90% confidence level, is reduced by approximately $35,000 and the maximum revenue generated is reduced by approximately $20,000.

Figure 5E:
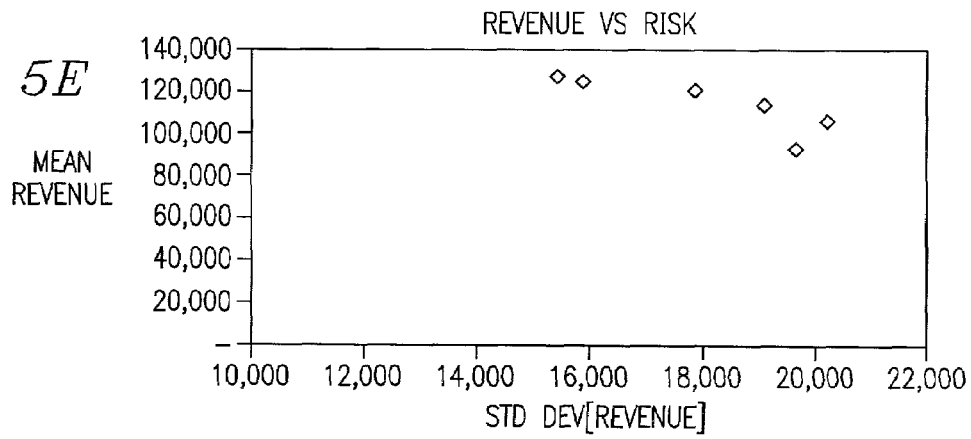

FIG. 5E is a graph of revenue versus risk, using mean-variance analysis. As shown in FIG. 5E, with a standard deviation of about $18,000, the mean revenue is approximately $120,000. Thus, with a risk of about $18,000, a mean revenue of approximately $120,000 may be generated. However, this does not represent the best risk-return tradeoff. The risk-return tradeoff is better when there is a risk of approximately $15,000, and a mean revenue of approximately $130,000 may be generated.

Figure 5F:
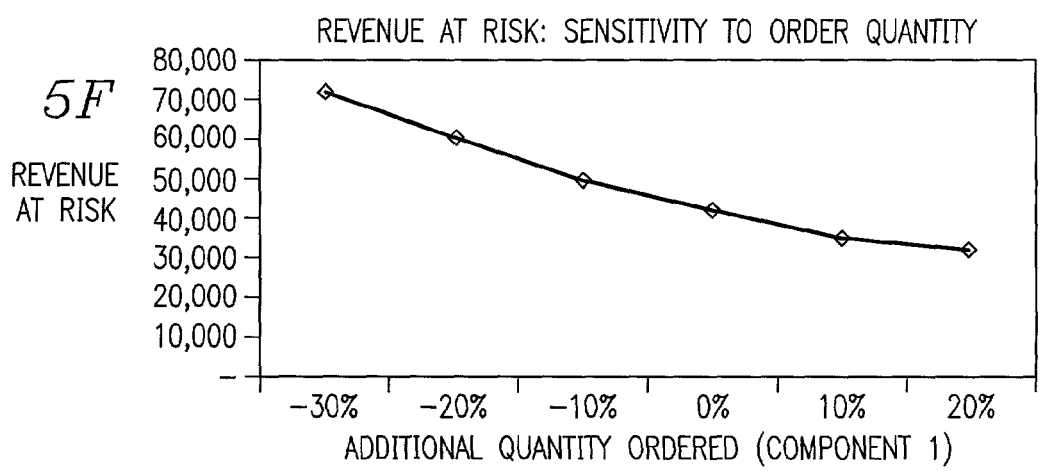

FIG. 5F is a graph of revenue at risk based on sensitivity to ordered quantity of component 1. As shown in FIG. 5F, the revenue at risk is approximately $70,000 with a 30% reduction in quantity of component 1 ordered. This revenue at risk is reduced with increased quantity of component 1 ordered, as shown.

Figure 5G:
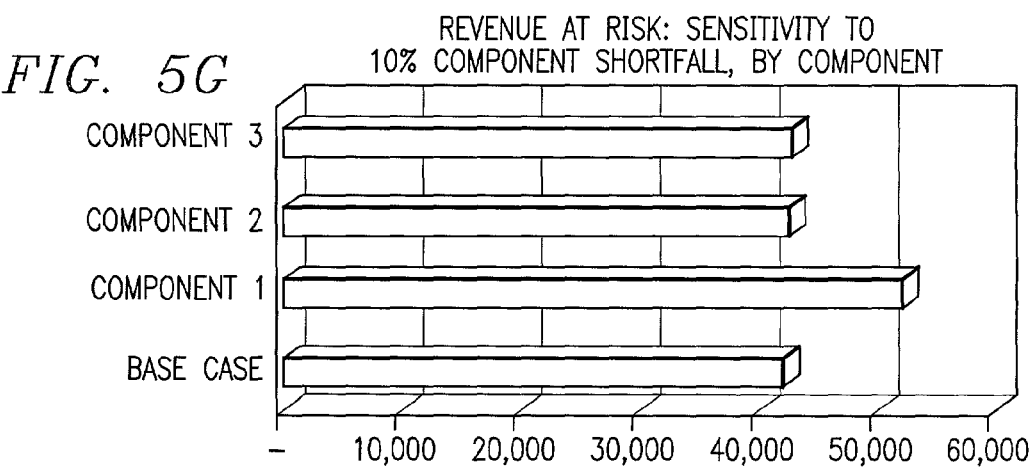

FIG. 5G is a graph of revenue at risk based on a sensitivity to 10% component shortfall. As shown in FIG. 5G, the revenue at risk for the base case, component 2 and component 3 are approximately the same. Thus, a 10% reduction in components 2 and 3 will not affect the revenue at risk appreciably. However, a 10% reduction in component 1 increases the revenue at risk by approximately $10,000.

Figure 5H:
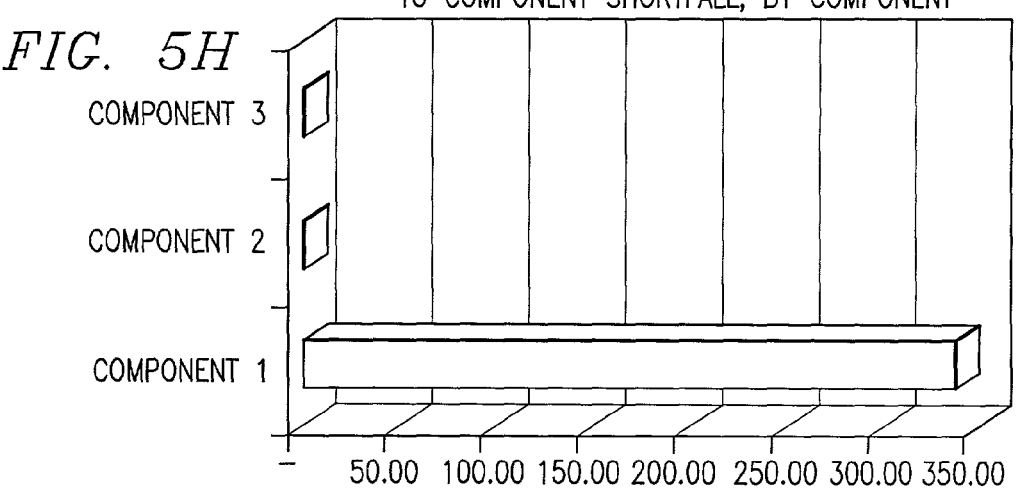

FIG. 5H is a graph of revenue at risk based on dollar sensitivity to component shortfall. As shown in FIG. 5H, for every dollar not spent on components 2 and 3, only a minute amount of revenue is at risk. For every dollar not spent on component 1, $336.20 of revenue is at risk.

Thus, it is clear from the above, that component 1 is the critical component in the production of products 1 and 2. From these simulation results, a human operator may determine that excess quantities of component 1 should be kept on hand to handle any possible shortfall. By examining the sensitivity of revenue at risk to the order quantity of component 1, the firm can choose an order quantity to match its risk preferences. The firm can also vary the order quantities for the other components in conjunction with component 1, to determine order quantities aligned with the firm's risk preferences.

Figure 5I:
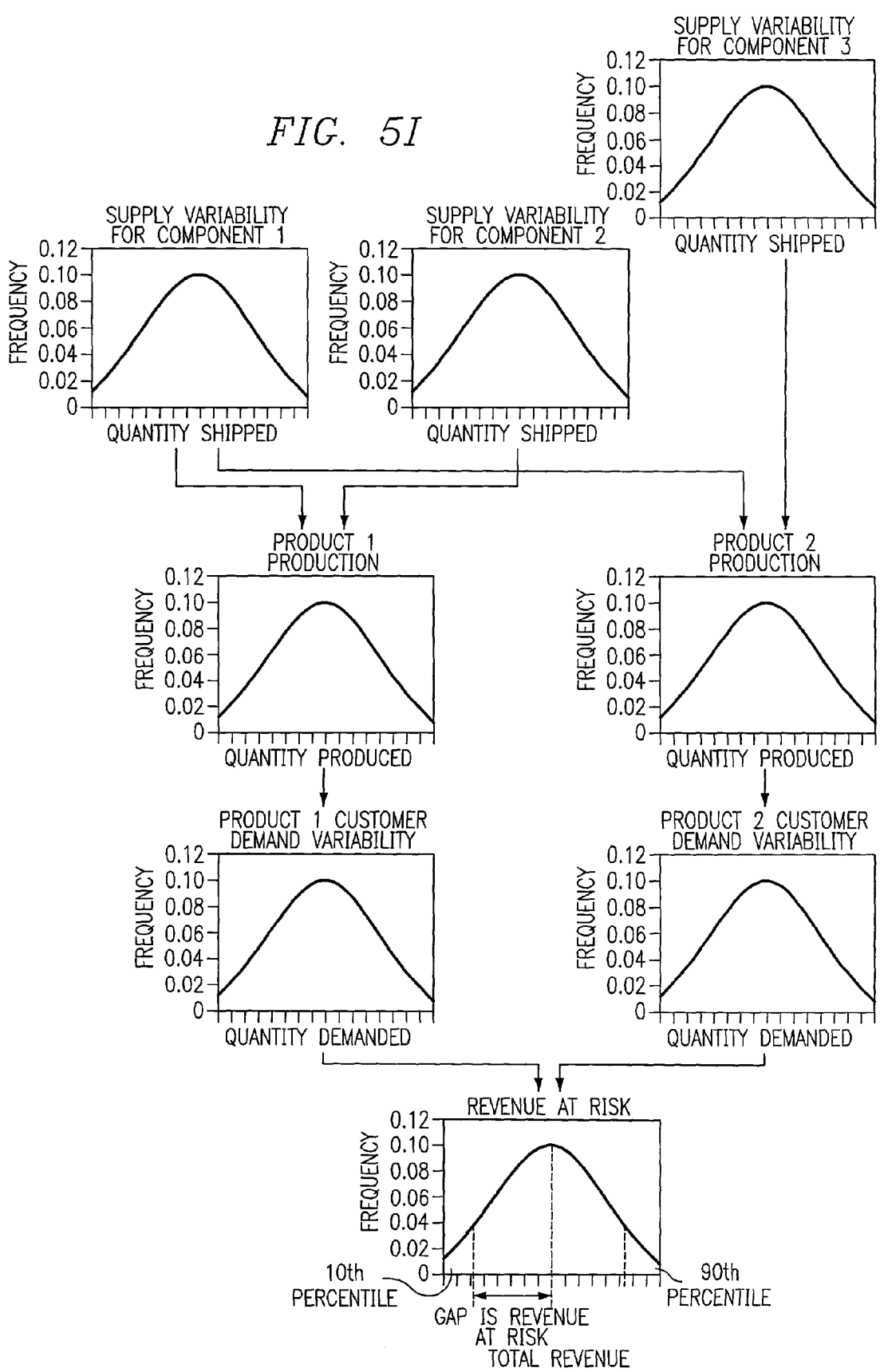
FIG. 5I is a diagram illustrating how the simulation results may be used to generate a revenue at risk distribution according the present invention.

FIG. 5I shows how the results above may be used to generate an actual revenue at risk distribution. As shown in FIG. 5I, supply variability for each of the components is obtained and production amounts for each of the products 1 and 2 are determined based on the supply variability. These production amounts are used along with the customer demand variability to then generate a revenue at risk distribution. The revenue represented by the gap between the 10th percentile and the mean, is the revenue at risk with respect to the expected (mean) revenue.

Of course revenue at risk can be computed with respect to other reference values, such as target revenue from the firm's planning process, or from the anticipated revenue that would be realized if the firm met all of its expected demand.

Figure 6:
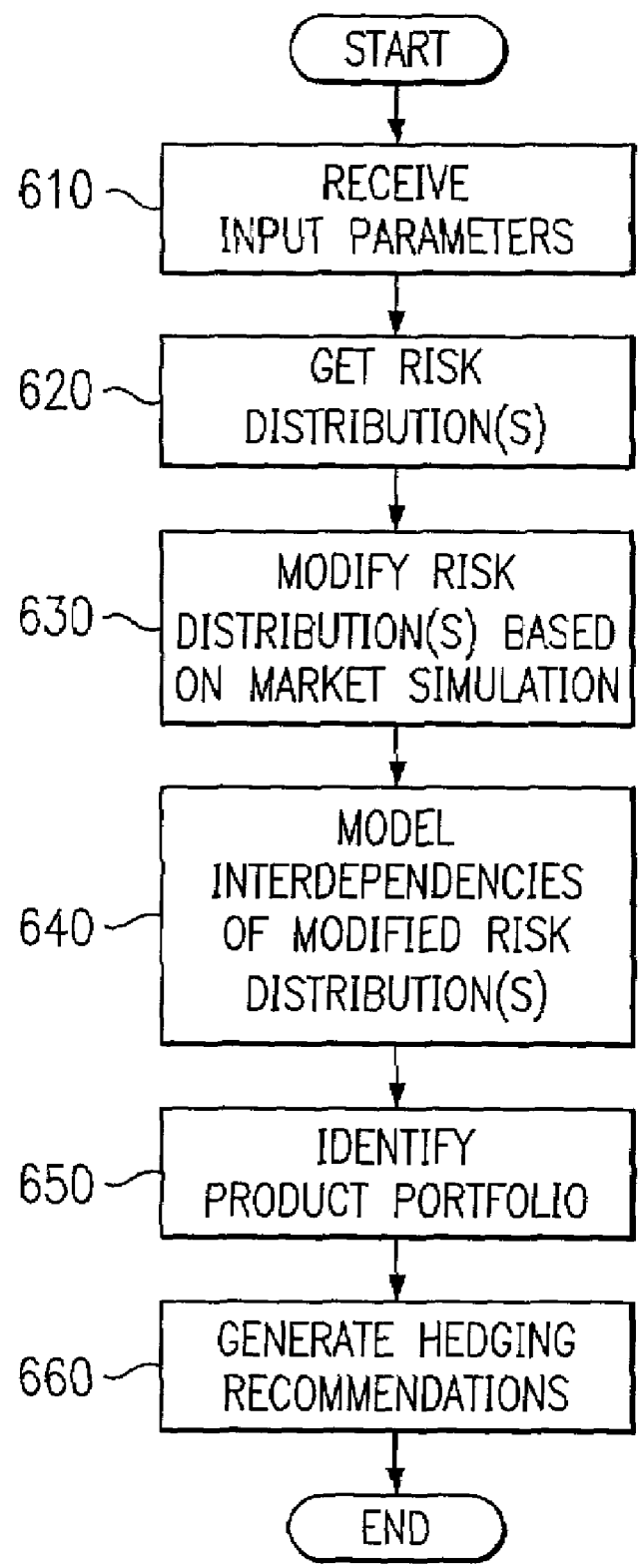
FIG. 6 is a flowchart outlining an exemplary operation of the present invention.

FIG. 6 is a flowchart outlining an exemplary operation of the present invention. As shown in FIG. 6, the operation starts with receiving input parameters (step 610). A risk distribution for supply uncertainty is then generated based on the input parameters (step 620). The risk distribution may then be modified by a market simulation (step 630). In an alternative embodiment, and thus an optional step, if risk distributions along a plurality of dimensions are generated, the interdependencies of the risk distributions may be modeled to obtain a combined distribution of revenue at risk (step 640).

Optionally, the distribution of revenue at risk may then be used to identify a portfolio of products whose risk-return characteristics meet business goals of the manufacturer (step 650). In addition, optionally, the distribution of revenue at risk may be used to determine hedging recommendations to ensure sufficient safeguards to produce final products in accordance with market requirements (step 660). The operation then ends.

Thus, the present invention provides a mechanism by which revenue at risk for a supply chain may be determined. The resultant distribution of revenue at risk is then utilized to determine a product portfolio and/or hedging information for use in managing supply chain risk of the manufacturer of the final product. The present invention may take into consideration risk distributions along multiple dimensions and may integrate them based on interdependencies of the dimensions.

While the present invention has been described in terms of a risk distribution based on supply uncertainty, the present invention is not limited to such an embodiment. Rather, any number of risk distributions may be used with the present invention as may be deemed fit to the particular application of the present invention. Thus, more risk distributions along other dimensions, as described above, may be generated and used with the present invention without departing from the spirit and scope of the present invention. Other risk factors that could affect the supply chain include credit risk (such as the risk that a supplier will default on its commitments, or go bankrupt), casualty risk (such as the risk that an earthquake will result in a disruption to the production or delivery of goods), political risk (risks associated with foreign governments, such as the risk that a production facility of the firm or a supplier will be expropriated by a foreign government, or risks associated with a non-government organization), price risk (such the risk associated with volatility in the prices of purchased components or volatility in the prices of finished goods), etc. The present invention may be used to generate risk distributions for any of these and other potential risk factors.

While the present invention has been described revenue at risk as being represented by the revenue gap between the 10th percentile and the mean, other percentiles could be used. Furthermore, revenue at risk can be computed with respect to other reference values, such as target revenue from the firm's planning process, or from the anticipated revenue that would be realized if the firm met all of its expected demand.

In addition, other "at risk" value metrics could be used. The same approach could be used to calculate "cash flow at risk" at risk, "earnings at risk", "firm value at risk", "book value at risk", "intangible value of reputation at risk", "quality at risk", "service level at risk", "production quantity at risk," "profit at risk", "market value at risk", "unit output at risk", and the like. Moreover different "at risk" methodologies may be used with the present invention, including value at risk based on the value metric, relative value at risk based on the value metric, and tracking error based on the value metric.

The interdependency simulation has been described in simple terms, but in practice there could be complex interdependencies between the risk factors. These could include simple correlations in the risk factors, as shown by an analysis of historical covariances. It also could include a quantifiable sensitivity to a common risk factor. For example, if two different suppliers of two different parts have production facilities near an earthquake fault line, then the risk associated with an earthquake would apply to both suppliers. Similarly, general strikes or political unrest in a particular country could be expected to affect most if not all suppliers located in that country. Analytical techniques known to those familiar with the art, such as factor analysis, scenario analysis, shock testing, and sensitivity analysis can all be employed using the present invention to derive a more complete picture of the firm's risk exposure, and the potential impact on the firm's success.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of managing supply chain risk, comprising:
    receiving product manufacturing information;
    generating at least one risk distribution from the product manufacturing information, wherein the at least one risk distribution is along one or more of a quantity dimension, a time dimension, a space dimension and a quality dimension;
    receiving at least one market input parameter characterizing a market for the product;
    performing a market simulation on the at least one risk distribution using the at least one market input parameter to generate at least one modified risk distribution; and
    managing supply chain risk based on the at least one modified risk distribution.

2. The computer implemented method of claim 1, wherein the at least one risk distribution is along a dimension of supply uncertainty.

3. The computer implemented method of claim 1, wherein managing the supply chain risk includes determining a portfolio of products based on the at least one modified risk distribution and one or more risk distributions of other products.

4. The computer implemented method of claim 3, wherein determining a portfolio of products includes determining the portfolio of products based on one or more rules describing business goals of a manufacturer of the product.

5. The computer implemented method of claim 1, wherein managing the supply chain risk includes determining one or more hedging recommendations based on the at least one modified risk distribution.

6. The computer implemented method of claim 5, wherein the one or more hedging recommendations include one or more of changing contractual terms and conditions, providing supplier penalties, maintaining extra inventory of high-risk components of the product, developing sourcing strategies with multiple suppliers, using insurance policies, and using financial products.

7. The computer implemented method of claim 1, wherein the product manufacturing information includes one or more of a listing of components of the product, a listing of suppliers of the components, a geographical location of the suppliers of the components, shipping services information, shipping route information, forecasts of component availability, forecasts of labor availability, costs of each of the components, selling price of the product, and maximum amount of inventory of components kept on hand.

8. The computer implemented method of claim 1, wherein the product manufacturing information includes a list of components of the product and one or more rules for combining the components to form the product.

9. The computer implemented method of claim 1, wherein the product manufacturing information is received from one or more of user input, software applications, databases associated with software applications, data warehouses, data marts, market data suppliers, geographical databases, government data suppliers, and commercial data suppliers.

10. The computer implemented method of claim 1, wherein the market input parameters include one or more of historical labor turnover rates, probability of a labor strike, probability of a market slow down, environmental effects information, demand volatility for the product, volatility in supplier lead times, variants in component quality, and variants in supplier serviceability.

11. The computer implemented method of claim 1, wherein the market simulation simulates market influences on the at least one risk distribution.

12. The computer implemented method of claim 1, wherein managing supply chain risk includes assessing an impact of the at least one modified risk distribution on a firm's performance.

13. The computer implemented method of claim 12, wherein assessing the impact of the at least one modified risk distribution on the firm's performance includes employing a value metric comprising at least one of revenue, profit, cash flow, market value, unit output, quality, earnings, firm value, book value, intangible value of reputation, service level, production quantity.

14. The computer implemented method of claim 13, wherein assessing the impact of the at least one modified risk distribution on the firm's performance employs a risk measurement methodology comprising at least one of value at risk based on the value metric, relative value at risk based on the value metric, tracking error based on the value metric.

15. A computer implemented method of managing supply chain risk, comprising:
    receiving product manufacturing information;
    generating at least one risk distribution from the product manufacturing information;
    receiving at least one market input parameter characterizing a market for the product;
    performing a market simulation on the at least one risk distribution using the at least one market input parameter to generate at least one modified risk distribution; and
    managing supply chain risk based on the at least one modified risk distribution, wherein the at least one risk distribution includes a first risk distribution and a second risk distribution, the method further comprising inputting the first risk distribution and second risk distribution into an interdependency simulation that simulates an interdependency of the first risk distribution and the second risk distribution.

16. An apparatus for managing supply chain risk, comprising:

a risk distribution determination device which receives product manufacturing information and generates at least one risk distribution from the product manufacturing information, wherein the at least one risk distribution is along one or more of a quantity dimension, a time dimension, a space dimension and a quality dimension; and at least one supply chain management device coupled to the risk distribution determination device, wherein the at least one supply chain management device includes a market simulation device which performs a market simulation on the at least one risk distribution using at least one market input parameter characterizing a market for the product to generate a modified risk distribution, and wherein the at least one supply chain management device manages supply chain risk based on the at least one modified risk distribution.

17. The apparatus of claim 16, wherein the at least one risk distribution is along a dimension of supply uncertainty.

18. The apparatus of claim 16, wherein the at least one supply chain management device includes a portfolio determination device that determines a portfolio of products based on the at least one modified risk distribution and one or more risk distributions of other products.

19. The apparatus of claim 18, wherein the portfolio determination device determines a portfolio of products based on one or more rules describing business goals of a manufacturer of the product.

20. The apparatus of claim 16, wherein the at least one supply chain management device includes a hedging device that generates one or more hedging recommendations based on the at least one modified risk distribution.

21. The apparatus of claim 20, wherein the one or more hedging recommendations include one or more of changing contractual terms and conditions, providing supplier penalties, maintaining extra inventory of high-risk components of the product, developing sourcing strategies with multiple suppliers, using insurance policies, and using financial products.

22. The apparatus of claim 16, wherein the product manufacturing information includes one or more of a listing of components of the product, a listing of suppliers of the components, a geographical location of the suppliers of the components, shipping services information, shipping route information, forecasts of component availability, forecasts of labor availability, costs of each of the components, selling price of the product, and maximum amount of inventory of components kept on hand.

23. The apparatus of claim 16, wherein the product manufacturing information includes a list of components of the product and one or more rules for combining the components to form the product.

24. The apparatus of claim 16, wherein the product manufacturing information is received in the risk distribution determination device from one or more of user input, software applications, databases associated with software applications, data warehouses, data marts, market data suppliers, geographical databases, government data suppliers, and commercial data suppliers.

25. The apparatus of claim 16, wherein the market input parameters include one or more of historical labor turnover rates, probability of a labor strike, probability of a market slow down, environmental effects information, demand volatility for the product, volatility in supplier lead times, variants in component quality, and variants in supplier serviceability.

26. The apparatus of claim 16, wherein the market simulation device simulates market influences on the at least one risk distribution.

27. An apparatus for managing supply chain risk, comprising:

a risk distribution determination device which receives product manufacturing information and generates at least one risk distribution from the product manufacturing information; and at least one supply chain management device coupled to the risk distribution determination device, wherein the at least one supply chain management device includes a market simulation device which performs a market simulation on the at least one risk distribution using at least one market input parameter characterizing a market for the product to generate a modified risk distribution, and wherein the at least one supply chain management device manages supply chain risk based on the at least one modified risk distribution, further comprising an interdependency simulation device, wherein the at least one risk distribution includes a first risk distribution and a second risk distribution, and wherein the first risk distribution and second risk distribution are input into the interdependency simulation device that simulates an interdependency of the first risk distribution and the second risk distribution.

28. A computer program product in a computer readable medium for managing supply chain risk, comprising:

first instructions for receiving product manufacturing information;

second instructions for generating at least one risk distribution from the product manufacturing information, wherein the at least one risk distribution is along one or more of a quantity dimension, a time dimension, a space dimension and a quality dimension;

third instructions for receiving at least one market input parameter characterizing a market for the product;

fourth instructions for performing a market simulation on the at least one risk distribution using the at least one market input parameter to generate at least one modified risk distribution; and fifth instructions for managing supply chain risk based on the at least one modified risk distribution.

29. The computer program product of claim 28, wherein the at least one risk distribution is along a dimension of supply uncertainty.

30. The computer program product of claim 28, wherein the fifth instructions include instructions for determining a portfolio of products based on the at least one modified risk distribution and one or more risk distributions of other products.

31. The computer program product of claim 30, wherein the instructions for determining a portfolio of products include instructions for determining the portfolio of products based on one or more rules describing business goals of a manufacturer of the product.

32. The computer program product of claim 28, wherein the fifth instructions include instructions for determining one or more hedging recommendations based on the at least one modified risk distribution.

33. The computer program product of claim 32, wherein the one or more hedging recommendations include one or more of changing contractual terms and conditions, providing supplier penalties, maintaining extra inventory of high-risk components of the product, developing sourcing strategies with multiple suppliers, using insurance policies, and using financial products.

34. The computer program product of claim 28, wherein the product manufacturing information includes one or more of a listing of components of the product, a listing of suppliers of the components, a geographical location of the suppliers of the components, shipping services information, shipping route information, forecasts of component availability, forecasts of labor availability, costs of each of the components, selling price of the product, and maximum amount of inventory of components kept on hand.

35. The computer program product of claim 28, wherein the product manufacturing information includes a list of components of the product and one or more rules for combining the components to form the product.

36. The computer program product of claim 28, wherein the product manufacturing information is received from one or more of user input, software applications, databases associated with software applications, data warehouses, data marts, market data suppliers, geographical databases, government data suppliers, and commercial data suppliers.

37. The computer program product of claim 28, wherein the market input parameters include one or more of historical labor turnover rates, probability of a labor strike, probability of a market slow down, environmental effects information, demand volatility for the product, volatility in supplier lead times, variants in component quality, and variants in supplier serviceability.

38. The computer program product of claim 28, wherein the market simulation simulates market influences on the at least one risk distribution.

39. A computer program product in a computer readable medium for managing supply chain risk, comprising:
   first instructions for receiving product manufacturing information;
   second instructions for generating at least one risk distribution from the product manufacturing information;
   third instructions for receiving at least one market input parameter characterizing a market for the product;
   fourth instructions for performing a market simulation on the at least one risk distribution using the at least one market input parameter to generate at least one modified risk distribution; and
   fifth instructions for managing supply chain risk based on the at least one modified risk distribution, wherein the at least one risk distribution includes a first risk distribution and a second risk distribution, the computer program product further comprising fifth instructions for inputting the first risk distribution and second risk distribution into an interdependency simulation that simulates an interdependency of the first risk distribution and the second risk distribution.

* * * * *